United States Patent
Xie et al.

(10) Patent No.: US 11,949,585 B2
(45) Date of Patent: Apr. 2, 2024

(54) BIER PACKET SENDING METHOD AND APPARATUS

(71) Applicant: HUAWEI TECHNOLOGIES CO., LTD., Guangdong (CN)

(72) Inventors: Jingrong Xie, Beijing (CN); Yang Xia, Beijing (CN); Yisong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 17/542,505

(22) Filed: Dec. 6, 2021

(65) Prior Publication Data

US 2022/0109623 A1    Apr. 7, 2022

Related U.S. Application Data

(63) Continuation of application No. PCT/CN2020/094791, filed on Jun. 7, 2020.

(30) Foreign Application Priority Data

Jun. 6, 2019   (CN) .......................... 201910493114.7

(51) Int. Cl.
  *G06F 15/173*    (2006.01)
  *H04L 45/00*    (2022.01)
  (Continued)

(52) U.S. Cl.
  CPC .............. *H04L 45/16* (2013.01); *H04L 45/24* (2013.01); *H04L 45/34* (2013.01); *H04L 45/745* (2013.01)

(58) Field of Classification Search
  CPC .............................. H04L 45/24; H04L 45/745
  See application file for complete search history.

(56) References Cited

U.S. PATENT DOCUMENTS 7,526,571 B1   4/2009 Tappan et al.
9,444,677 B2   9/2016 Kumar et al.
(Continued)

FOREIGN PATENT DOCUMENTS

CN    105933228 A    9/2016
CN    106572017 A    4/2017
(Continued)

OTHER PUBLICATIONS

J Xie et al: "Network Working Group Encapsulation for BIER inNon-MPLS IPv6 Networks draft-xie-bier-6man-encapsulation-02", Network Working Group Internet-Draft, Sep. 1, 2018(Sep. 1, 2018), pp. 1-11, XP055765700, Retrieved from the Internet: URL:https ://tools. ietf.org/pdf /draft-xie-bier-6manencapsulation-02. pdf[retrieved on Jan. 15, 2021].
(Continued)

*Primary Examiner* — Joseph R Maniwang
(74) *Attorney, Agent, or Firm* — HUAWEI TECHNOLOGIES CO., LTD.

(57) ABSTRACT

This application provides a BIER packet sending method. The method includes: receiving a BIER packet that is encapsulated using an IPv6 protocol and that is sent by a second forwarding device, where the BIER packet includes an IPv6 basic header and a BIER header, a destination address field in the IPv6 basic header is a first IPv6 address of the first forwarding device; determining, based on an identifier corresponding to a first IPv6 address in a forwarding table, to perform BIER forwarding on the BIER packet, where the identifier is used to indicate that the first IPv6 address is a destination address for BIER forwarding. In the technical solution provided in this application, a node may determine, based on the identifier of the first IPv6 address, to perform BIER forwarding on the BIER packet.

29 Claims, 5 Drawing Sheets

```
┌─────────────────────────────────────────────────────┐
│ A first forwarding device receives a BIER packet    │── 410
│ that is encapsulated using an IPv6 protocol and     │
│ that is sent by a second forwarding device          │
└─────────────────────────────────────────────────────┘
                         │
┌─────────────────────────────────────────────────────┐
│ The first forwarding device determines, based on    │
│ an identifier of a first IPv6 address that is       │
│ encapsulated in a BIER packet and that is included  │── 420
│ in a forwarding table, to perform BIER forwarding   │
│ on the BIER packet, where the identifier is used    │
│ to indicate that the first IPv6 address is a        │
│ destination address based on which BIER forwarding  │
│ is performed                                        │
└─────────────────────────────────────────────────────┘
```

(51) Int. Cl.
*H04L 45/16* (2022.01)
*H04L 45/24* (2022.01)
*H04L 45/745* (2022.01)

(56) References Cited

U.S. PATENT DOCUMENTS

| | | | | |
|---|---|---|---|---|
| 9,762,488 | B2* | 9/2017 | Previdi | H04L 69/22 |
| 10,652,134 | B1* | 5/2020 | Morris | H04L 12/66 |
| 2015/0078379 | A1* | 3/2015 | Wijnands | H04L 45/74 |
| | | | | 370/390 |
| 2015/0109902 | A1 | 4/2015 | Kumar et al. | |
| 2015/0131658 | A1 | 5/2015 | Wijnands et al. | |
| 2015/0256456 | A1 | 9/2015 | Previdi et al. | |
| 2016/0142248 | A1 | 5/2016 | Thubert et al. | |
| 2017/0099232 | A1 | 4/2017 | Shepherd et al. | |
| 2017/0214618 | A1 | 7/2017 | Banerjee et al. | |
| 2017/0250907 | A1 | 8/2017 | Pignataro et al. | |
| 2017/0302575 | A1 | 10/2017 | Ward et al. | |
| 2017/0302576 | A1 | 10/2017 | Townsley et al. | |
| 2018/0027100 | A1 | 1/2018 | Jeuk et al. | |
| 2018/0205565 | A1 | 7/2018 | Wijnands et al. | |
| 2018/0205636 | A1 | 7/2018 | Hu et al. | |
| 2018/0287935 | A1 | 10/2018 | Wang et al. | |
| 2018/0375763 | A1 | 12/2018 | Brissette et al. | |
| 2019/0020583 | A1 | 1/2019 | Bashandy et al. | |
| 2019/0104059 | A1 | 4/2019 | Surcouf et al. | |

FOREIGN PATENT DOCUMENTS

| | | |
|---|---|---|
| CN | 106603407 A | 4/2017 |
| CN | 106921579 A | 7/2017 |
| CN | 107592262 A | 1/2018 |
| CN | 108632150 A | 10/2018 |
| CN | 108965134 A | 12/2018 |
| CN | 109510771 A | 3/2019 |
| CN | 109729012 A | 5/2019 |
| CN | 109756425 A | 5/2019 |
| CN | 110784411 A | 2/2020 |
| WO | 2018040941 A1 | 3/2018 |
| WO | 2019057199 A1 | 3/2019 |

OTHER PUBLICATIONS

J. Xie et al.,"Encapsulation for BIER in Non-MPLS IPv6 Networks draft-xie-6man-bier-encapsulation-02", Sep. 6, 2018,total:11pages.

J. Xie et al.,:"Encapsulation for BIER in Non-MPLS IPv6 Networks draft-xie-bier-ipv6-encapsulation-01",Jun. 19, 2019,total:13pages.

IJ. Wijnands, Ed.et al.,"Multicast Using Bit Index Explicit Replication (BIER)",Nov. 2017,total:43pages.RFC8279.

IJ. Wijnands, Ed. et al.,"Encapsulation for Bit Index Explicit Replication in MPLS Networks draft-ietf-bier-mpls-encapsulation-00",Apr. 27, 2015,total:13pages.

J. Xie et al.,"Encapsulation for BIER in Non-MPLS IPv6 Networks draft-xie-bier-ipv6-encapsulation-00",Mar. 8, 2019,total:12pages.

IJ. Wijnands, Ed. et al.,Encapsulation for Bit Index Explicit Replication (BIER) in MPLS and Non-MPLS Networks,Jan. 2018,total:24pages.rfc8296.

C. Filsfils et al., "SRv6 Network Programming draft-ietf-spring-srv6-network-programming-00",Apr. 24, 2019, total:21pages.

C. Filsfils, Ed. et al.,"IPv6 Segment Routing Header (SRH) draft-ietf-6man-segment-routing-header-18",Apr. 5, 2019,total:30pages.

Z. Zhang et al.,"BIER Penultimate Hop Popping draft-ietf-bier-php-01",Nov. 28, 2018,total:7pages.

E. Rosen, et al.,"Multicast VPN Using Bit Index Explicit Replication (BIER)", Apr. 2018, total:17pages.RFC8556.

Li Yanbiao, Research of high performance routing lookup toward the future Internet, B.E. (Hunan University)2009, A dissertation submitted in partial satisfaction of the Requirements for the degree of Doctor of Engineering in Computer Science and Technology Graduate school of Hunan University, Mar. 2016, with the English Abstract, 249 pages.

* cited by examiner

| Ver | TC | Flow label (flow label) | | |
|---|---|---|---|---|
| Payload length (payload length) | | NH | HL | |
| SA | | | | |
| DA | | | | |
| NH | Hdr Ext Len | Option type | Option length | |
| BIFT-id | | TC | S | TTL |
| Nibble | Ver | BSL | Entropy | |
| OAM | RSV | DSCP | Proto | BFIR-ID |
| Bit string length (bit string) | | | | |
| Original user data packet | | | | |

IPv6 header — IPv6 extension header — BIER header — BIER packet

BIER PACKET SENDING METHOD AND APPARATUS

CROSS-REFERENCE TO RELATED APPLICATIONS

This application is a continuation of International Application No. PCT/CN2020/094791, filed on Jun. 7, 2020, which claims priority to Chinese Patent Application No. 201910493114.7, filed on Jun. 6, 2019. The disclosures of the aforementioned applications are hereby incorporated by reference in their entireties.

TECHNICAL FIELD

This application relates to the network communication field, and more specifically, to a bit index explicit replication BIER packet sending method and apparatus.

BACKGROUND

An internet protocol (IP) multicast technology implements efficient point-to-multipoint data transmission on an IP network, thereby effectively saving network bandwidth and reducing network load. Therefore, the internet protocol multicast technology is widely used in real-time data transmission, multimedia conferencing, data copy, internet protocol television (IPTV), games, simulation, and the like. According to a multicast protocol using the multicast technology, a control plane multicast tree needs to be constructed to make a network plane be in a logical tree-like structure, so as to implement point-to-multipoint data forwarding. A transit node in such a multicast routing protocol that takes distribution tree construction as a core needs to maintain a complex status of multicast forwarding information. As a network scale grows and multicast data traffic is increasing, the multicast technology faces increasingly high costs and big operation and maintenance challenges.

To address this, a new technology for constructing a multicast data forwarding path is put forward in the industry, and is referred to as a bit index explicit replication (BIER) technology. The technology proposes a new multicast technical architecture that does not need to construct a multicast distribution tree. A forwarding node that supports the BIER technology can forward a BIER packet in a BIER domain based on encapsulated BIER header information.

The BIER packet needs to be encapsulated for transmission using internet protocol version 6 (IPv6). In a conventional technical solution, a forwarding node supporting the BIER technology encapsulates a common IP address flooded by each node into a destination address field in an IPv6 basic header. However, because the common IP address is filled in the destination address field, a node that receives a BIER packet needs to determine a type of a packet format based on the IPv6 address in the destination address field, thereby causing a relatively low forwarding efficiency.

Therefore, how to improve forwarding efficiency is a problem that urgently needs to be resolved currently.

SUMMARY

This application provides a BIER packet sending method and apparatus. A first IPv6 address of a neighboring node may be filled in a destination address field in an IPv6 extension header. In this way, the neighboring node determines, based on an identifier of the first IPv6 address, to perform BIER forwarding on a BIER packet. This prevents a node that receives a BIER packet from determining a packet type based on an IPv6 address and other fields one by one in a conventional technology. Therefore, forwarding efficiency is improved.

According to a first aspect, a BIER packet sending method is provided. The method includes: A first forwarding device receives a BIER packet that is encapsulated using an internet protocol version 6 IPv6 protocol and that is sent by a second forwarding device, where the BIER packet includes an IPv6 basic header and a BIER header, and a destination address field in the IPv6 basic header is a first IPv6 address of the first forwarding device. The first forwarding device determines, based on an identifier corresponding to the first IPv6 address in a forwarding table, to perform BIER forwarding on the BIER packet, where the identifier is used to indicate that the first IPv6 address is a destination address based on which BIER forwarding is performed.

In the foregoing technical solution, a first IPv6 address of a neighboring node may be filled in a destination address field in an IPv6 extension header, so that the neighboring node determines, based on an identifier of the first IPv6 address, to perform BIER forwarding on the BIER packet. This prevents a node that receives a BIER packet from determining a packet type based on an IPv6 address and other fields one by one in a conventional technology. Therefore, forwarding efficiency is improved.

In a possible implementation, the first forwarding device determines that an address filled in the destination address field in the IPv6 basic header is the same as the first IPv6 address in the forwarding table; and the first forwarding device determines, based on the identifier corresponding to the first IPv6 address, to perform BIER forwarding on the BIER packet.

In another possible implementation, the first forwarding device configures the first IPv6 address and the identifier.

In another possible implementation, before that a first forwarding device receives a BIER packet that is encapsulated using an internet protocol version 6 IPv6 protocol and that is sent by a second forwarding device, the method further includes: The first forwarding device floods the first IPv6 address of the first forwarding device and the identifier to a network by using a routing protocol.

In the foregoing technical solution, the first forwarding device may flood the first IPv6 address and the identifier to other nodes in the network, so that the other nodes in the network establish a forwarding table and encapsulates a packet based on the first IPv6 address flooded by the first forwarding device.

It should be understood that the first IPv6 address of the first forwarding device and the identifier that are flooded by the first forwarding device to the network by using the routing protocol may be carried in a same message as a BIER message, or may be in a message different from the BIER message. This is not specifically limited in this application.

In another possible implementation, the first IPv6 address is a segment identifier (SID) of segment routing over IPv6 (SRv6).

In another possible implementation, when a next header (NH) field in the IPv6 basic header is an extension header carrying one BIER header, the first forwarding device performs BIER forwarding based on a bit string field in the BIER header.

In another possible implementation, when a next header NH field in the IPv6 basic header is a routing header (RH), and a next header NH field in the routing header RH is an extension header carrying one BIER header, the first forwarding device pops the routing header RH, and performs BIER forwarding based on the bit string field in the BIER header.

In another possible implementation, the routing header RH is a segment routing header (segment routing header, SRH), and a segment left SL of the segment routing header SRH is 0.

In another possible implementation, when a next header NH field in the IPv6 basic header is an extension header carrying one BIER header, and a next header NH field in the extension header is an authentication header (AH), the first forwarding device performs BIER forwarding based on the bit string field in the BIER header.

In another possible implementation, when a next header NH field in the IPv6 basic header is 4, 41, 97, or 137, the first forwarding device pops the IPv6 basic header, and forwards the user data packet.

In another possible implementation, the first forwarding device fills a first IPv6 address of a third forwarding device in the destination address field in the IPv6 basic header of the BIER packet based on a bit string in the BIER header and a BIER forwarding table, where the BIER forwarding table is established based on a first IPv6 address carried in a message flooded by the third forwarding device; and the first forwarding device replicates the BIER packet to the third forwarding device based on the BIER forwarding table.

In another possible implementation, the first forwarding device pops one or more carried BIER headers; the first forwarding device pops an extension header that includes one or more BIER headers; and the first forwarding device replicates a BIER packet that does not include the extension header to the third forwarding device.

In another possible implementation, when determining that the third forwarding device is a leaf node, the first forwarding device pops an extension header that carries one or more BIER headers.

In another possible implementation, the extension header is a destination options header.

In another possible implementation, the routing protocol includes any one of the following protocols: an intermediate system to intermediate system IS-IS protocol, an open shortest path first OSPF protocol, or a border gateway protocol BGP.

According to a second aspect, a BIER packet sending apparatus is provided, where the apparatus includes:
  a receiving module, configured to receive a BIER packet that is encapsulated using an internet protocol version 6 IPv6 protocol and that is sent by a second forwarding device, where the BIER packet includes an IPv6 basic header and a BIER header and a destination address field in the IPv6 basic header is a first IPv6 address of the first forwarding device; and
  a processing module, configured to determine, based on an identifier corresponding to the first IPv6 address in a forwarding table, to perform BIER forwarding on the BIER packet, where the identifier is used to indicate that the first IPv6 address is a destination address based on which BIER forwarding is performed.

In a possible implementation, the processing module is specifically configured to: determine that an address filled in the destination address field in the IPv6 basic header is the same as the first IPv6 address in the forwarding table. The first forwarding device determines, based on the identifier corresponding to the first IPv6 address, to perform BIER forwarding on the BIER packet.

In another possible implementation, the apparatus further includes a configuration module, configured to configure the first IPv6 address and the identifier.

In another possible implementation, the apparatus further includes: a sending module, configured to flood the first IPv6 address of the first forwarding device and the identifier to a network by using a routing protocol.

In another possible implementation, the processing module is specifically configured to: when a next header NH field in the IPv6 basic header is an extension header carrying one BIER header, perform BIER forwarding based on a bit string field in the BIER header.

In another possible implementation, the processing module is specifically configured to: when a next header NH field in the IPv6 basic header is a routing header RH, and a next header NH field in the routing header RH is an extension header carrying one BIER header, pop the routing header RH, and perform BIER forwarding based on a bit string field in the BIER header.

In another possible implementation, the routing header RH is a segment routing header SRH, and a segment left SL of the segment routing header SRH is 0.

In another possible implementation, the processing module is specifically configured to: when a next header NH field in the IPv6 basic header is an extension header carrying one BIER header, and a next header NH field in the extension header is an AH, perform BIER forwarding based on a bit string field in the BIER header.

In another possible implementation, the processing module is specifically configured to: fill a first IPv6 address of a third forwarding device in the destination address field in the IPv6 basic header of the BIER packet based on a bit string in the BIER header and a BIER forwarding table, where the BIER forwarding table is established based on a first IPv6 address carried in a BIER message flooded by the third forwarding device, and the first forwarding device replicates the BIER packet to the third forwarding device based on the BIER forwarding table.

In another possible implementation, the processing module is specifically configured to: pop one or more carried BIER headers; pop an extension header that includes one or more BIER headers; and replicate a BIER packet that does not include the extension header to the third forwarding device.

In another possible implementation, the processing module is specifically configured to: when determining that the third forwarding device is a leaf node, pop an extension header that carries one or more BIER headers.

In another possible implementation, the extension header is a destination options header.

In another possible implementation, the routing protocol includes any one of the following protocols: an intermediate system to intermediate system IS-IS protocol, an open shortest path first OSPF protocol, or a border gateway protocol BGP.

According to a third aspect, a first forwarding device is provided, including: an input/output interface, a processor, and a memory, where the processor is configured to control the input/output interface to send and receive information, the memory is configured to store a computer program, and the processor is configured to invoke the computer program from the memory and run the computer program, so that the first forwarding device performs the method according to any one of the first aspect or the possible implementations of the first aspect.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

According to a fourth aspect, a computer program product is provided. The computer program product includes computer program code. When the computer program code is run on a computer, the computer is enabled to perform the methods in the foregoing aspects.

According to a fifth aspect, a computer-readable medium is provided. The computer-readable medium stores program code, and when the computer program code is run on a computer, the computer is enabled to perform the methods in the foregoing aspects.

According to a sixth aspect, a system is provided. The system includes a first forwarding node, a second forwarding node, and a third forwarding node, where the first forwarding node is configured to perform the method according to any one of the foregoing first aspect or the possible implementations of the first aspect. The second forwarding node is configured to fill a destination address field in an IPv6 basic header of a BIER packet based on a first IPv6 address flooded by the first forwarding node, and send the BIER packet to the first forwarding node. The third forwarding node is configured to receive a BIER packet sent by the first forwarding node, and perform BIER forwarding on the BIER packet based on that an address filled in a destination address field in an IPv6 basic header of the BIER packet is a first IPv6 address configured for the third forwarding node.

DESCRIPTION OF EMBODIMENTS

The following describes technical solutions of this application with reference to accompanying drawings.

An internet protocol (IP) multicast technology implements efficient point-to-multipoint data transmission on an IP network, thereby effectively saving network bandwidth and reducing network load. Therefore, the internet protocol multicast technology is widely used in real-time data transmission, multimedia conferencing, data copy, internet protocol television (IPTV), games, simulation, and the like. According to a multicast protocol using the multicast technology, a control plane multicast tree needs to be constructed to make a network plane be in a logical tree-like structure, so as to implement point-to-multipoint data forwarding. A transit node in such a multicast routing protocol that takes distribution tree construction as a core needs to maintain a complex status of multicast forwarding information. As a network scale grows and multicast data traffic is increasing, the multicast technology faces increasingly high costs and big operation and maintenance challenges.

Figure 1:
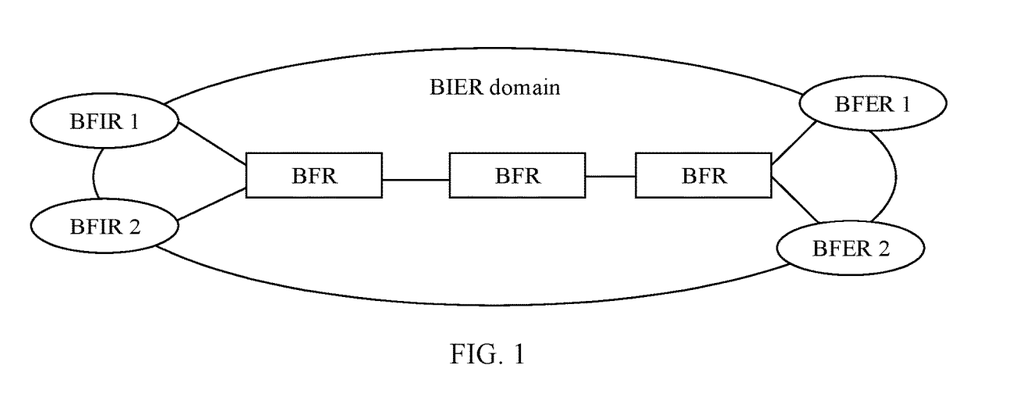
FIG. 1 is a schematic networking diagram of a BIER technology according to an embodiment of this application.

Therefore, a new technology for constructing a multicast data forwarding path is put forward in the industry, and is referred to as a bit index explicit replication (BIER) technology. The technology proposes a new multicast technical architecture that does not need to construct a multicast distribution tree. As shown in FIG. 1, a router that supports the BIER technology may be referred to as a bit forwarding router (BIER forwarding router, BFR), and the BFR device may receive and forward a BIER packet. A multicast forwarding domain including one or more BFRs is referred to as a BIER domain. At an edge of the BIER domain, a device that performs BIER data packet encapsulation on multicast data of a user is referred to as a bit forwarding ingress router (BIER forwarding ingress router, BFIR), and a device that decapsulates a BIER data packet is referred to as a bit forwarding egress router (BIER forwarding egress router, BFER).

In a BIER domain, each edge node (for example, a BFER) is configured with a bit position that is globally unique in an entire BIER sub-domain (SD). For example, a value may be configured as a BFR identifier (ID) for each edge node, for example, a value ranging from 1 to 256. All BFR IDs in the BIER domain form a bit string. A specific BIER header needs to be encapsulated for transmission of user data traffic (also referred to as a BIER packet) in the BIER domain. The BIER header contains a bit string that identifies all destination nodes of the user data traffic. A transit node in the BIER domain performs routing based on the bit string carried in the BIER header, to ensure that the user data traffic can be sent to all the destination addresses.

Bit position information configured for a node is flooded in the BIER domain in advance by using an interior gateway protocol (IGP) or an border gateway protocol (BGP). Then a bit index forwarding table (BIFT) is formed to indicate the user data traffic to be forwarded to each node in the BIER domain. When receiving the BIER packet encapsulated with the BIER header, the BFR forwards the BIER packet to the destination node according to the BIFT. In the embodiments of this application, the interior gateway protocol IGP may include but is not limited to an open shortest path first (OSPF) protocol, an intermediate system to intermediate system (ISIS) protocol, and the like.

For ease of understanding, the following describes basic concepts in the BIER technology.

(1) BIFT ID

A BIFT ID field may include a combination of a sub-domain (SD)/bit string length (BSL)/set identifier (SI). Different BIFT IDs may correspond to different combinations of SDs/B SLs/SIs.

1. Sub-Domain (SD)

A BIER domain may be configured with different sub-domains SDs according to a requirement of an actual service scenario. Each sub-domain SD is represented by a sub-domain identifier (SD-ID), which is an 8-bit value in the range [0-255]. For example, different SDs may be configured in the BIER domain based on different services, for example, different virtual private networks (VPN). For example, a VPN 1 uses an SD 0, and a VPN 1 uses an SD 1.

It should be noted that a plurality of VPNs may alternatively use a same SD. Different SDs in the BIER domain may be in a same IGP process or topology, or may not be in a same IGP process or topology. This is not specifically limited in the embodiments of this application.

2. Bit String Length (BSL)

A BSL is a length of a bit string included in the BIER header. There may be a plurality of BSLs. This is not specifically limited in the embodiments of this application. The BSL may be 64 bits (minimum), 128 bits, 256 bits, 512 bits, 1024 bits, 2048 bits, or 4096 bits (maximum). Specifically, four bits are used for identification in the packet. For example, when the BSL is 64 bits, 0001 is used for identification in the packet; when the BSL is 128 bits, 0010 is used for identification in the packet; when the BSL is 512 bits, 0100 is used for identification in the packet; when the BSL is 1024 bits, 0101 is used for identification in the packet; and so on.

3. Set Identifier (SI)

An SI may be understood as a set including a plurality of nodes or configured BFR IDs in a network. For example, when the BSL is 256 bits, but there are more than 256 nodes or more than 256 BFR IDs configured in the network, the nodes or the BFR IDs need to be divided into different sets. For example, nodes whose BFR IDs are 1 to 256 form a set 0 (setindex 0, or SI=0), and nodes whose BFR IDs are 257 to 512 form a set 1 (setindex 1, or SI=1).

After receiving the BIER packet, the BFR in the BIER domain may determine, based on the BIFT ID in the BIER header, an SD to which the BIER packet belongs, a used BSL, and a set including nodes that forward the packet or configured BFR IDs.

The following lists several possible combinations of SDs/BSLs/SIs represented by BIFT IDs.

BIFT ID=91: corresponding to SD 0, BSL 256, SI 0
BIFT ID=92: corresponding to SD 0, BSL 256, SI 1
BIFT ID=93: corresponding to SD 0, BSL 256, SI 2
BIFT ID=94: corresponding to SD 0, BSL 256, SI 3
BIFT ID=95: corresponding to SD 0, BSL 512, SI 0
BIFT ID=96: corresponding to SD 0, BSL 512, SI 1

For example, when BIFT ID is 92, after receiving the BIER packet, the BFR may determine, based on the BIFT ID in the BIER header, that the BIER packet belongs to the SD 0, the BSL used in the BIER header is 256 bits, and the BIER packet belongs to the set 1 (a set including the nodes whose BFR IDs are 257 to 512).

(2) BFR-Prefix

A BFR-prefix is address information of each BFR. The address information of each BFR is unique in a BIER domain and is equivalent to a router identifier. Specifically, the BFR-prefix is generally a loopback address of the BFR device.

(3) Bit String

Each bit in a bit string may be used to indicate a next-hop node that receives the BIER packet. When the BFR in the BIER domain receives a BIER packet header, the BFR forwards the BIER packet based on a bit string and a BIFT ID that are carried in the BIER header.

For example, the BIFT ID in the BIER header received by the BFR is 92, the length of the bit string is 256 bits, and a node that forwards the BIER packet is one of the nodes whose BFR IDs are 257 to 512. A least significant bit (rightmost bit) in the bit string is used to indicate that a destination node is a node whose BFR ID is 257, and a second bit from right to left in the bit string is used to indicate that a destination node is a node whose BFR ID is 258.

Figure 2:
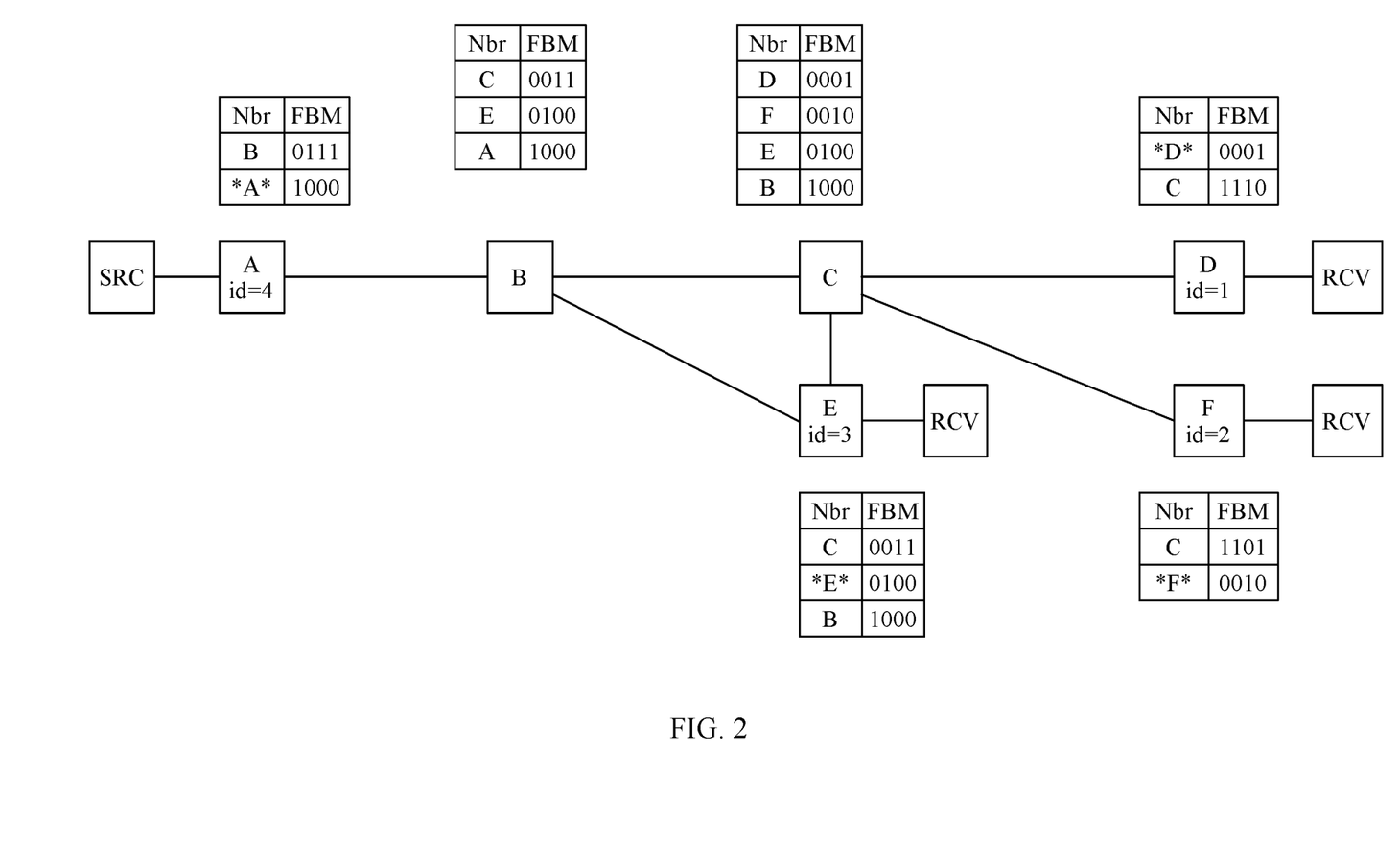
FIG. 2 is a schematic block diagram of sending a BIER packet based on a BIER header in a BIER domain according to an embodiment of this application.

With reference to FIG. 2, the following describes in detail a process of forwarding a BIER packet based on the BIER technology.

As shown in FIG. 2, a unique BFR-id needs to be assigned to an edge node in each BIER domain. For example, BFR-ids configured for edge nodes A, D, E, and F are respectively 4, 1, 3, and 2. The bit string encapsulated in the BIER header identifies all destination nodes of the traffic. For example, a bit string corresponding to the node D whose BFR-id is 1 is 0001, a bit string corresponding to the node F whose BFR-id is 2 is 0010, a bit string corresponding to the node E whose BFR-id is 3 is 0100, and the bit string corresponding to the node A whose BFR-id is 4 is 1000.

It should be understood that a BFR-id value assigned to the edge node in each BIER domain may be flooded to other network devices in the BIER domain by using a routing protocol, and flooded BIER information further includes an IP address and encapsulation information of the edge node. For example, flooded BIER information of the node A carries an IP address and an BIFT-id of the node A. A node in the BIER domain may establish a bit index forwarding table BIFT based on the flooded BIER information. After receiving a BIER packet, the node forwards the BIER packet to the destination node according to the established BIFT.

For the node A, next-hops to BIER nodes whose BFR-ids are 1, 2, and 3 are the node B, and a next-hop to a BIER node whose BFR-id is 4 is the node A itself. Therefore, a BIFT established by the node A is as follows:

Forwarding entry 1: Neighbor (Nbr)=B, forwarding bit mask (FBM)=0111;
Forwarding entry 2: Nbr*=A, FBM=1000.

The forwarding entry 1 is used to indicate that when any one of a first bit, a second bit, or a third bit of a bit string in a BIER packet from right to left is 1, the BIER packet is sent to the neighboring node B. The forwarding entry 2 is used to indicate that when a fourth bit of a bit string in the BIER packet from right to left is 1, the BIER packet is sent to the node A. Because the node A is itself, the node A strips the BIER header and forwards the BIER packet as an original user data packet.

It should be noted that, in the forwarding entry, * is used to indicate that Nbr is a node itself. Similarly, another node may also establish a BIFT based on a neighboring node. For details, refer to FIG. 2. Details are not described herein again.

After receiving a user data packet, the node A encapsulates the user data packet with a BIER header. In an example, after receiving the user data packet, the node A may learn of a receiver of the user data packet based on a Border Gateway Protocol BGP message. For example, receivers of the user data packet are the node E whose BFR-id is 3, the node F whose BFR-id is 2, and the node D whose BFR-id is 1. The node A encapsulates a BIER packet with the BIER header in which the bit string is 0111, and forwards the encapsulated BIER packet to the neighboring node B based on the forwarding entry 1. After receiving the BIER packet, the node B determines, based on a bit string 0111 and the BIFT, that the BIER packet needs to be separately sent to the node C and the node E. When sending the BIER packet to the node C, the node B may perform an AND operation on the bit string 0111 in the BIER header and an FBM field of the Nbr=C entry in the BIFT. In this embodiment of this application, an AND result is 0011. Therefore, the node B may modify the bit string in the BIER header to 0011, and send the BIER packet to the node C. Similarly, when sending the BIER packet to the node E, the node B may modify the bit string in the BIER header to 0100. After receiving the BIER packet, the node E determines, based on the bit string 0100, that the BIER packet is to be sent to a neighboring node E. Because the node E determines that the neighboring node E is the node E itself according to the identifier * in the forwarding table, the node E decapsulates the BIER header, and forwards the BIER packet based on a destination address of the inner-layer user data packet.

It should be understood that the BIER header has different encapsulation formats in different protocols. A BIER packet encapsulated using IPv6 may also be referred to as a BIERv6 packet. A format of a BIERv6 packet that uses an Ethernet link at the link layer is as follows:

Eth header+IPv6 basic header+IPv6 extension header (including a BIER header)+User data packet It should be noted that, for ease of description, an example in which encapsulation of the BIERv6 packet is overlaid on an Ethernet link layer is used. In this embodiment of this application, BIER encapsulation may alternatively be overlaid on another type of link, for example, a point-to-point protocol (PPP) link.

It should be understood that there are a plurality of IPv6 extension header types, for example, the IPv6 extension header may be a destination options header. This is not specifically limited in the embodiments of this application.

Figure 3:
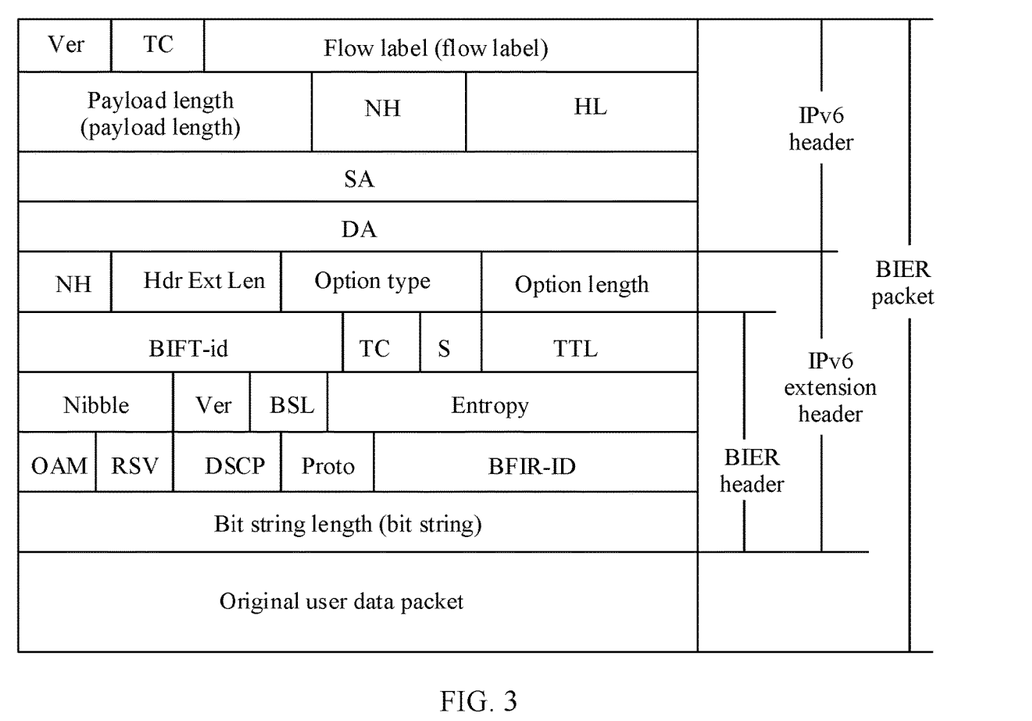
FIG. 3 is a schematic diagram of a BIERv6 packet format according to an embodiment of this application.

With reference to FIG. 3, the following uses an example in which an IPv6 extension header is a destination options header to describe in detail a format of a BIER packet encapsulated using IPv6.

Referring to FIG. 3, a BIERv6 packet may include a BIERv6 header and an inner-layer user data packet (for example, may be an IPv6 packet). The BIERv6 header may include an IPv6 basic header and a destination options header. The destination options header carries a BIER header. For details about the BIER header, refer to the foregoing description. Details are not described herein again.

(1) IPv6 Basic Header

Version: 4 bits long.

Traffic class (TC): 8 bits long. This field indicates a class and priority of an IPv6 packet.

Flow label: 20 bits long. A "flow" may be understood as a data packet from a specific source address to a specific destination address on a network. Data packets belonging to a same "flow" have a same flow label.

Payload length: 16 bits long. This field indicates a length of parts other than the IPv6 basic header, for example, a length of an IPv6 extension header and an inner-layer user data packet.

Next header (NH): 8 bits long. This field may be understood as an identifier of an IPv6 extension header (namely, a type of an IPv6 extension header) that immediately follows the IPv6 basic header, where each IPv6 extension header also includes an NH field.

Hop limit (HL): 8 bits long. This field is similar to a time to live (time to live, TTL) field in an IPv4 packet header.

Source address (SA): 128 bits long. This field is used to fill in an IPv6 address of a node that sends a data packet.

Destination address (DA): 128 bits long. This field is used to fill in an IPv6 address of a node that receives the data packet. The destination address field is a unicast address. For example, when sending a BIER packet to the node D, the node B may fill the destination address field with an IPv6 address of the node D.

(2) Destination Options Header

Next header (NH): 8 bits long. This field may be understood as an identifier of an IPv6 extension header (namely, a type of an IPv6 extension header) that immediately follows the destination options header, or a type of an upper-layer header, for example, a type of a user datagram protocol (UDP) packet.

Extension header length (header extend length, Hdr Ext Len): 8 bits long. This field describes a length of an IPv6 extension header, for example, a length of the destination options header.

Type-length-value (TLV): A type value in the TLV indicates that the TLV includes one BIER header, and a value part in the TLV includes the entire BIER header. Specifically, a type value in the TLV is carried in an option type field shown in FIG. 3, and a value part is carried in a BIER header field shown in FIG. 3.

According to the BIER packet sending method provided in this embodiment of this application, an IPv6 address that carries an identifier and that is of a node receiving the BIER packet may be filled in a destination address field of an IPv6 extension header. In this way, the node receiving the BIER packet determines, based on the identifier of the IPv6 address, to perform BIER forwarding on the BIER packet. This prevents a node that receives the BIER packet from determining a packet type based on an IPv6 address and other fields one by one in the conventional technology. Therefore, forwarding efficiency is improved.

Figure 4:
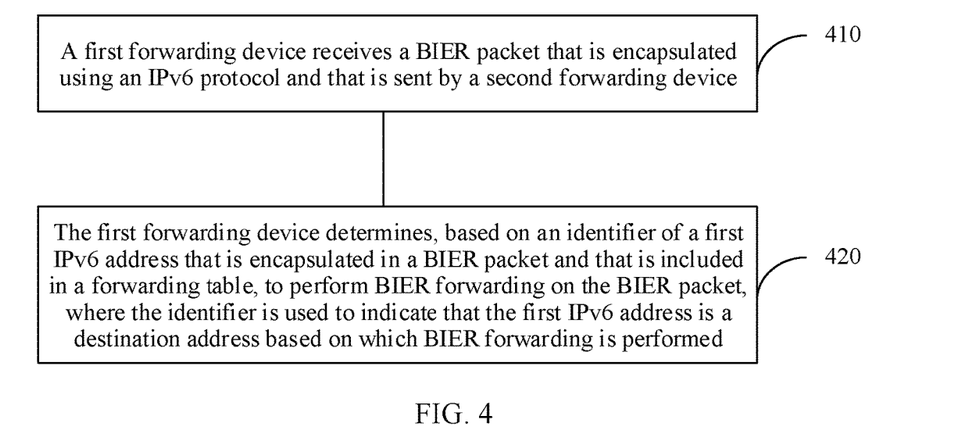
FIG. 4 is a schematic flowchart of a BIER packet sending method according to an embodiment of this application.

FIG. 4 is a schematic flowchart of a BIER packet sending method according to an embodiment of this application. The method in FIG. 4 may include steps 410 and 420. The following separately describes steps 410 and 420 in detail.

Step 410: A first forwarding device receives a BIER packet that is encapsulated using an IPv6 protocol and that is sent by a second forwarding device.

The BIER packet encapsulated using the IPv6 protocol received by the first forwarding device includes an IPv6 basic header and a BIER header. For a specific format of the BIER packet encapsulated using the IPv6 protocol, refer to the description of FIG. 3. Details are not described herein again.

It should be noted that the BIER packet may include multicast data or unicast data. This is not specifically limited in this embodiment of this application.

Step 420: The first forwarding device determines, based on an identifier of a first IPv6 address that is encapsulated in a BIER packet and that is included in a forwarding table, to perform BIER forwarding on the BIER packet, where the identifier is used to indicate that the first IPv6 address is a destination address based on which BIER forwarding is performed.

The first forwarding device determines that an address filled in a destination address field in the IPv6 basic header is the first IPv6 address, and determines whether the first IPv6 address exists in a locally stored forwarding table. If the first IPv6 address is configured, it may be understood that the first forwarding device is a receiving node of the BIER packet. The first forwarding device may further determine, based on the identifier corresponding to the first IPv6 address in the forwarding table, that BIER forwarding needs to be performed on the BIER packet, where the identifier is used to indicate that the first IPv6 address is the destination address based on which BIER forwarding is performed.

For example, if the identifier corresponding to the first IPv6 address configured in the forwarding table is End-.BIER, it may be understood that an end function configured for the first IPv6 address is performing BIER forwarding on the BIER packet. The first IPv6 address may also be referred to as an IPv6 address of an End.BIER type.

It should be noted that the first IPv6 address may be an address newly configured for the first forwarding device, or may be an address already configured. This is not specifically limited in this embodiment of this application.

Optionally, in some embodiments, a node in a BIER domain, for example, a first forwarding device, may flood an IPv6 address of an End.BIER type to other nodes in the BIER domain, to form a BIFT used to indicate each node in the BIER domain to forward a BIER packet. In other words, each node in the BIER domain may establish a BIFT or a BIER routing table based on an IPv6 address of an End.BIER type flooded by a neighboring node.

There are a plurality of implementations in which the first forwarding device may flood the IPv6 address of the End.BIER type to other nodes in the BIER domain. This is not specifically limited in this embodiment of this application. In an example, the first forwarding device uses a BFR-IPv6-prefix flooding message to carry an identifier indicating that the first IPv6 address is of an End.BIER type. In another example, the first forwarding device uses a message different from the BFR-IPv6-prefix flooding message, that is, the first forwarding device uses an SRv6 locator message to carry the IPv6 address of the End.BIER type and an identifier corresponding to the IPv6 address. This identifier indicates that a type of the IPv6 address is End.BIER. The following provides detailed description with reference to specific examples. Details are not described herein again.

It should be understood that an IPv6 address of the End.BIER type is used to indicate an IPv6 destination address carried when a BIERv6 packet is encapsulated and forwarded.

The following describes in detail a BIER packet sending process provided in this embodiment by using an example in which the first forwarding device is the node B shown in FIG. 2.

Step 1: The node B configures an IPv6 address of the End.BIER type.

In a possible implementation, the configured IPv6 address of the End.BIER type may be an IPv6 address different from an IPv6-prefix. For example, a SID can be selected from an SRv6 locator address space. The following is a specific implementation for configuring an IPv6 address of the End.BIER type in locator:

segment-routing ipv6
  locator as1 ipv6-prefix 2002::
    opcode ::AAAA End.BIER ## Configure 2002::AAAA as a SID of the End.BIER type.
    opcode ::AAAB End.X ## Configure 2002::AAAB as a SID of the End.X type.

In another possible implementation, the configured IPv6 address of the End.BIER type may be an IPv6 address with a 128-bit mask configured on an interface (for example, a loopback interface). The configuration method of the IPv6 address of the End.BIER type is different from the configuration method of a common IPv6 address. The specific configuration method is as follows:

interface loopback0
  ipv6 address 2001::000A 128 ## This is a common IPv6 address.
  ipv6 address 2001::000B 128 End.BIER ## This is an IPv6 address of the End.BIER type.

The following is a configuration in which an IPv6 address of the End.BIER type is also used as a BFR-IPv6-Prefix:
Bier
  sub-domain 6 ipv6 ## Configure a BIER sub-domain 6 to use IPv6.
    BFR-prefix 2001::000B ## Configure the IPv6 address of the End.BIER type as the BFR-IPv6-prefix.

The following is another configuration in which an IPv6 address of the End.BIER type is also used as a BFR-IPv6-Prefix:
Bier
  sub-domain 6 ipv6 ## Configure a BIER Sub-domain 6 to use IPv6.
    BFR-prefix loopback0 ## Use the IPv6 address of the End.BIER type configured on loopback0 as a BFR-prefix.

Step 2: The node B locally stores and floods the configured IPv6 address of the End.BIER type.

In a possible implementation, a message used by the node B to flood the IPv6 address of the End.BIER type and End.BIER indication information thereof to other nodes in the BIER domain is different from a message used to flood BIER information. For example, the IPv6 address of the End.BIER type and the End.BIER indication information are carried in an IS-IS SRv6 locator message, and the BIER information is carried in an IS-IS prefix-reachability message.

Figure 5:
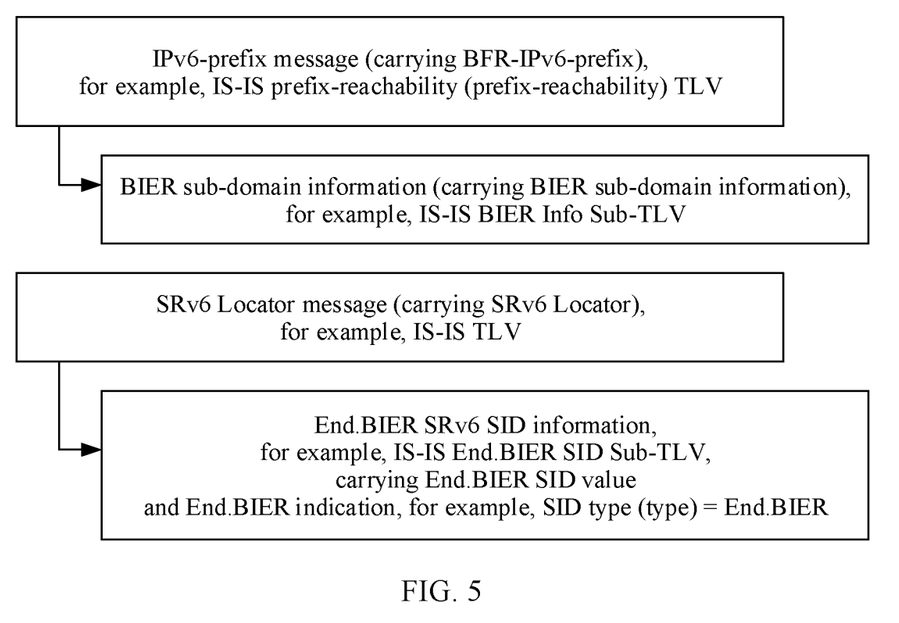
FIG. 5 is a schematic diagram of an SRv6 locator message format according to an embodiment of this application.

Specifically, referring to FIG. 5, the BIER information is carried in an IS-IS prefix-reachability TLV message. The message carries an IPv6 address of BFR-Prefix (referred to as a BFR-IPv6-Prefix), and further carries BIER sub-domain information, for example, the BIER sub-domain information may be a BIER information sub-TLV (BIER Info sub-TLV). The IPv6 address of the End.BIER type is carried in an IS-IS SRv6 locator message. For example, a SID value (for example, the SID indicates the first IPv6 address) of the End.BIER and an End.BIER indication (for example, the SID type indicates End.BIER) may be carried in SRv6 SID information of the End.BIER in the SRv6 locator message. The IPv6 address of the End.BIER type may be different from or the same as the IPv6 address corresponding to the BFR-Prefix.

In another possible implementation, the IPv6 address of the End.BIER type and the End.BIER identifier may be carried in a same message as the BIER information. For example, an IS-IS prefix-reachability message carries an End.BIER indication (for example, SID type=End.BIER), and further carries BIER information such as a BIER sub-domain SD.

Figure 6:
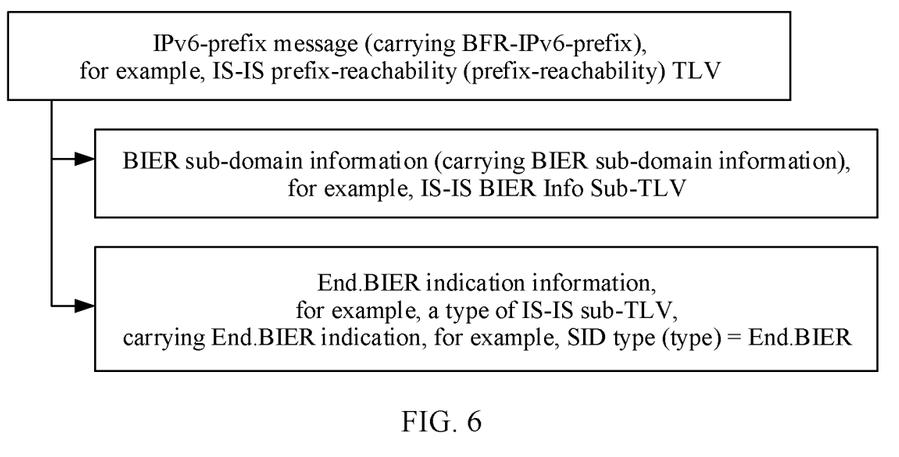
FIG. 6 is a schematic diagram of an IPv6-prefix message format according to an embodiment of this application.

Specifically, referring to FIG. 6, in addition to BIER sub-domain information, End.BIER indication information, for example, SID type=End.BIER may be also carried in a message used to flood BIER information. Correspondingly, the IPv6 address corresponding to the BFR-prefix is also used as the IPv6 address of the End.BIER type and has the End.BIER indication information.

Step 3: The node A encapsulates an IPv6 header based on the IPv6 address of the End.BIER type flooded by the node B.

The node A may establish a forwarding entry based on the IPv6 address of the End.BIER type flooded by the node B, and determine, according to the forwarding entry, that replication to the node B is needed. The node A then fills the IPv6 address of the End.BIER type flooded by the node B in a DA field in the IPv6 basic header, and sends the BIER packet to the node B.

Step 4: The node B performs BIER forwarding on the BIER packet based on the IPv6 address of the End.BIER type of the node B in the DA field carried in the received BIER packet.

After receiving the BIER packet sent by the node A, the node B determines that the address filled in the DA field in the IPv6 basic header is the IPv6 address of the End.BIER type configured for the node B. Specifically, the node B may determine that the IPv6 address in the locally stored forwarding table is the same as the address filled in the DA field in the IPv6 basic header, and determine, based on the identifier, for example, SID type=End.BIER, corresponding to the IPv6 address in the forwarding table, that BIER forwarding needs to be performed on the received BIER packet.

In a possible implementation, when a next header NH in the IPv6 basic header of the BIER packet received by the node B is an extension header carrying one BIER header, if the BIER packet includes an SRH header, the node B pops the SRH header, and performs BIER forwarding based on the bit string field in the BIER header. Otherwise, the node B discards the BIER packet and sends an internet control message protocol (internet control message protocol, ICMP) parameter problem message. In the following example, the next header NH in the IPv6 basic header is a destination options header. A specific configuration is as follows:

1. IF NH=60 ## The next header NH in the IPv6 basic header is the destination options header (identified by 60).
2. IF (DestOptHdr OptType=BIER) and (HdrExtLen*8+8=4+OptLength)
3. pop the SRH if exists. ## If the SRH header exists, pop the SRH header.
4. lookup the BIER Header inside the BIER. ## Locate the BIER header in the BIER.
5. forward via the matched entry. ## Forward the packet based on the matched entry.
6. ELSE
7. drop the packet; possibly send an ICMP parameter problem message;
8. ELSE
9. drop the packet; possibly send an ICMP parameter problem message;

"NH=60" indicates that a next header in the IPv6 basic header is the destination options header, and "DestOptHdr OptType=BIER" indicates that a type of a first option TLV in the destination options header is BIER. "HdrExtLen*8+8=4+OptLength" indicates that the destination options header includes only one TLV. The length of the TLV plus 4 is the same as the total length of a destination extension header (that is, the destination extension header contains only one BIER TLV).

In another possible implementation, when a next header NH in the IPv6 basic header of the BIER packet received by the node B is a segment routing header SRH, a segment left SL of the segment routing header SRH is 0, and a next header NH of the segment routing header SRH is an extension header carrying one BIER header, the node B pops the SRH header, and performs BIER forwarding based on a bit string field in the BIER header. Otherwise, the node B discards the BIER packet and sends an ICMP parameter problem message. In the following example, the next header NH in the routing header SRH is a destination options header. A specific configuration is as follows:

1. IF (NH=SRH and SL=0 and SRH_NH=DestOptHdr) ## Extension headers are SRH and DestOptHdr.
2. IF (DestOptHdr OptType=BIER) and (HdrExtLen*8+8=4+OptLength)
3. pop the SRH if exists. ## If the SRH header exists, pop the SRH header.
4. lookup the BIER Header inside the BIER. ## Locate the BIER header in the BIER.
5. forward via the matched entry. ## Forward the packet based on the matched entry.
6. ELSE
7. drop the packet; possibly send an ICMP parameter problem message;
8. ELSE IF (IPv6_NH=4 or 41 or 97 or 137)
9. pop the Outer IPv6 header, and process the next header.
10. ELSE
11. drop the packet; possibly send an ICMP parameter problem message;

In step 8, if the next header is a last NH of an NH chain, that is, the next header is an NH field filled with an upper-layer header, the upper-layer header may indicate a type of an inner-layer packet, and the node may forward the inner-layer user data packet. For example, IPv6_NH=4 indicates that a type of an inner-layer packet indicated by the next header is IPv4; IPv6_NH=41 indicates that a type of an inner-layer packet indicated by the next header is IPv6; IPv6_NH=6 indicates that a type of an inner-layer packet indicated by the next header is transmission control protocol (TCP); IPv6_NH=17 indicates that a type of an inner-layer packet indicated by the next header is user datagram protocol (user datagram protocol, UDP); IPv6_NH=58 indicates that a type of an inner-layer packet indicated by the next header is ICMP; and IPv6_NH=137 indicates that a type of an inner-layer packet indicated by the next header is multiprotocol label switching (MPLS).

In another possible implementation, when a next header NH in the IPv6 basic header of the BIER packet received by the node B is a fragment header, and a next header NH in the fragment header is an extension header carrying one BIER header; alternatively, when the IPv6 basic header is followed by an extension header carrying the BIER, and then a fragment header, the node B performs BIER forwarding based on a bit string field in the BIER header. Otherwise, the node B discards the BIER packet and sends an ICMP parameter problem message. The processing procedure is as follows.

1. IF (NH=Frag and Frag_NH=DestOptHdr) or (NH=DestOptHdr and Dest_NH=Frag)
2. IF (DestOptHdr OptType=BIER) and (HdrExtLen*8+8=4+OptLength)
3. pop the SRH if exists. ## If the SRH header exists, pop the SRH header.
4. lookup the BIER Header inside the BIER. ## Locate the BIER header in the BIER.
5. forward via the matched entry. ## Forward the packet based on the matched entry.
6. ELSE
7. drop the packet; possibly send an ICMP parameter problem message;
8. ELSE IF (IPv6_NH=4 or 41 or 97 or 137)
9. pop the Outer IPv6 header, and process the next header.
10. ELSE
11. drop the packet; possibly send an ICMP parameter problem message;

In another possible implementation, when a next header NH in the IPv6 basic header of the BIER packet received by the node B is an extension header carrying one BIER header, and a next header NH in the extension header is an authentication header (AH), if the BIER packet includes an SRH header, the node B pops the SRH header, and performs BIER forwarding based on a bit string field in the BIER header. Otherwise, the node B discards the BIER packet and sends an internet control message protocol (ICMP) parameter problem message. In the following example, the next header NH in the IPv6 basic header is a destination options header. A specific configuration is as follows:

1. IF (IPv6_NH=DestOptHdr and Dest_NH=AH)
2. IF (DestOptHdr OptType=BIER) and (HdrExtLen*8+ 8=4+OptLength)
3. pop the SRH if exists. ## If the SRH header exists, pop the SRH header.
4. lookup the BIER Header inside the BIER. ## Locate the BIER header in the BIER.
5. forward via the matched entry. ## Forward the packet based on the matched entry.
6. ELSE
7. drop the packet; possibly send an ICMP parameter problem message;
8. ELSE IF (IPv6_NH=4 or 41 or 97 or 137)
9. pop the Outer IPv6 header, and process the next header.
10. ELSE
11. drop the packet; possibly send an ICMP parameter problem message;

In another possible implementation, if a last NH of an IPv6 NH chain is ICMPv6 (that is, last_NH=ICMPv6), the BIER packet may be pumped to a central processing unit (CPU) for processing, for example, adding an ICMPv6 packet count or sending an ICMPv6 response packet. A specific configuration is as follows:

1. IF Last_NH=ICMPv6 ## If the last NH of the IPv6 NH chain indicates an ICMPv6 packet
2. Pump to CPU, add packet counter, possibly send an ICMP response message.

Step 5: The node B forwards the BIER packet to the neighboring node E.

The node B may determine, according to the forwarding entry and the bit string 0111, that the BIER packet needs to be separately sent to the node C and the node E. When sending the BIER packet to the node C, the node B may modify a bit string in the BIER header to 0011, fill an IPv6 address of an End.BIER type flooded by the node C in the DA field in the IPv6 basic header, and send the BIER packet to the node C. Similarly, when sending the BIER packet to the node E, the node B may modify a bit string in the BIER header to 0100, fill an IPv6 address of an End.BIER type flooded by the node E in the DA field in the IPv6 basic header, and send the BIER packet to the node E.

In a possible implementation, in this embodiment of this application, when the node B sends the BIER packet to the node E, if the neighboring node E of the node B is determined as a leaf node, the node B may pop the extension header that carries the BIER header in the BIER packet. For example, the node B pops the destination options header carrying the BIER header, and sends the BIER packet that does not include the destination options header carrying the BIER header to the node E. After the node E receives the BIER packet sent by the node B, because the node E is a leaf node, the node E needs to decapsulate the extension header that carries the BIER header, and forward the inner-layer user data packet. When the BIER packet sent by the node B does not include the extension header carrying the BIER header, the node E may directly forward the inner-layer user data packet without decapsulating the extension header carrying the BIER header. A specific configuration is as follows:

1. IF NH=60 ## The next header NH in the IPv6 basic header is the destination options header (identified by 60).
2. IF (DestOptHdr OptType=BIER) and (HdrExtLen*8+ 8=4+OptLength)
3. pop the DoH if exists. ## If the DoH header exists, pop the DoH header.
4. lookup the BIER Header inside the BIER. ## Locate the BIER header in the BIER.
5. forward via the matched entry. ## Forward the packet based on the matched entry.
6. ELSE
7. drop the packet; possibly send an ICMP parameter problem message;
8. ELSE IF (IPv6_NH=4 or 41 or 97 or 137)
9. pop the Outer IPv6 header, and process the next header.
10. ELSE
11. drop the packet; possibly send an ICMP parameter problem message;

When the BIER packet received by the node E does not include the BIER header, steps 1 to 7 may be skipped, and steps 8 and 9 may be directly performed, thereby reducing processing overheads of the leaf node E.

In the foregoing technical solution, more flexible BIER deployment may be further supported. For example, the leaf node E may not support reading or processing a BIER header, but the leaf node E may be deployed in a network according to this method provided that the leaf node E supports popping of an outer IPv6 header.

In another possible implementation, if the destination address received by the node B is the End.BIER of the B, the node B performs the following End.BIER processing procedure: The node B determines that there are N BIER headers in the IPv6 extension header, reads and replicates a $M^{th}$ BIER header (for example, replicates the $M^{th}$ BIER header to the node E), fills the End.BIER of the node E in the IPv6 DA field, pops other BIER headers except the $M^{th}$ BIER header, and retains only the $M^{th}$ BIER header. The length field of the IPv6 extension header is changed accordingly. In the following example, the next header NH in the IPv6 basic header is a destination options header. A specific configuration is as follows:

1. IF NH=60 //con2
2. IF (DestOptHdr OptType=BIER) and ((HdrExtLen*8+ 8)%(4+OptLength1)=0) //con1
3. Walk each TLV in DestOptHdr
4. If (OptType=BIER and OptLen=OptLength1) or(OptType=PadN and OptLen=0)
5. Continue
6. ELSE
7. Drop the packet; possibly send an ICMP parameter problem message;
8. End Walk of each TLV
9. For (N=0; N<(HdrExtLen*8+8)/(4+OptLength1); N++)
10. lookup the BIER Header begin from (N*OptLength1+ 4)bytes
11. copy packet if this packet need to forward to according to this lookup.
12. pop the TLV(s) except for this one, Set HdrExtLen= (4+OptLength1)/8.
13. forward via the matched entry,
14. END-FOR
15. ELSE //end of con1
16. drop the packet; possibly send an ICMP parameter problem message;
17. ELSE //end of con2
18. drop the packet; possibly send an ICMP parameter problem message;

In step 2, "HdrExtLen*8+8" represents a total length of the destination options header (DestOptHdr), and "OptLength1" represents a length (Length, that is, the length of the BIER header) in a first BIER TLV. The length of the BIER header plus 4 is an integer multiple of 8, because the destination options header (DestOptHdr) requires that the entire header length be an integer multiple of 8. The length of the destination options header is in a unit of 8 bytes and does not include the first 8 bytes. For example:
(NextHeader=x, Length=17, Type=BIER, Length=44) //Note 1;
(BIER header<12 bytes (fixed length)+32 bytes representing 256 bits>) //First BIER header;
(Type=PadN, Length=0, Type=BIER, Length=44) //Note 2;
(BIER header<12 bytes (fixed length)+32 bytes representing 256 bits>) //Second BIER header;
(Type=PadN, Length=0, Type=BIER, Length=44) //Note 3;
(BIER header<12 bytes (fixed length)+32 bytes representing 256 bits>) //Third BIER header;
Note 1: DestOptHdr starts with the NH and length fields.
Note 2: A PadN TLV is padded before a second BIER TLV
Note 3: A PadN TLV is padded before a third BIER TLV In the foregoing configuration, steps 3 to 8 are a loop in which whether a packet format meets a requirement is determined. In this embodiment of this application, a plurality of BIER headers are required to have a same length (that is, the same as the length OptLength1 of the first BIER header), and the second and subsequent BIER headers are padded with PadN (see padding requirements in RFC 8200).

In the foregoing configuration, steps 9 to 14 are another loop in which each BIER header is traversed but the PadN header is not processed. When the first BIER header is processed, it is relatively easy to pop the two BIER headers following the first BIER header, that is, only 96 bytes starting from a $(1*(OptLength1+4))^{th}$ byte need to be discarded and a length field (DestOptHdr Length) of the IPv6 extension header is set to 5. When the second BIER header is processed, the first and third BIER headers need to be popped, that is, the second BIER header (OptLength bytes starting from a $(1*(OptLength1+4)+4)^{th}$ byte) needs to be copied to the position where a $(0*(OptLength1+4)+4)^{th}$ byte resides, 96 bytes starting from a $(1*(OptLength1+4))^{th}$ byte are discarded, and DestOptHdr Length is set to 5. When the third BIER header is processed, the first and second BIER headers need to be popped, that is, the third BIER header (OptLength bytes starting from a $(2*(OptLength1+4)+4)^{th}$ byte) needs to be copied to the position where a $(0*(OptLength1+4)+4)^{th}$ byte resides, 96 bytes starting from a $(1*(OptLength1+4))^{th}$ byte are discarded, and DestOptHdr Length is set to 5.

The foregoing describes in detail the BIER packet sending method provided in the embodiments of this application with reference to FIG. 1 to FIG. 6. The following describes in detail a BIER packet sending apparatus in the embodiments of this application with reference to FIG. 7 and FIG. 8. It should be understood that the descriptions of the method embodiments correspond to descriptions of the apparatus embodiments. Therefore, for parts that are not described in detail, refer to the descriptions in the foregoing method embodiments.

Figure 7:
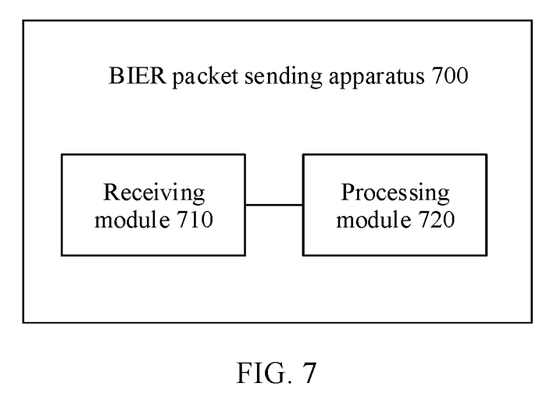
FIG. 7 is a schematic structural diagram of a BIER packet sending apparatus 700 according to an embodiment of this application.

FIG. 7 is a schematic structural diagram of a BIER packet sending apparatus 700 according to an embodiment of this application. The BIER packet sending apparatus 700 may include:
a receiving module 710, configured to receive a BIER packet that is encapsulated using an internet protocol version 6 IPv6 protocol and that is sent by a second forwarding device, where the BIER packet includes an IPv6 basic header and a BIER header and a destination address field in the IPv6 basic header is a first IPv6 address of the first forwarding device; and
a processing module 720, configured to determine, based on an identifier corresponding to the first IPv6 address in a forwarding table, to perform BIER forwarding on the BIER packet, where the identifier is used to indicate that the first IPv6 address is a destination address for BIER forwarding.

Optionally, the processing module 720 is specifically configured to: determine that an address filled in the destination address field in the IPv6 basic header is the same as the first IPv6 address in the forwarding table. The first forwarding device determines, based on the identifier corresponding to the first IPv6 address, to perform BIER forwarding on the BIER packet.

Optionally, the BIER packet sending apparatus 700 further includes a configuration module 740, configured to configure the first IPv6 address and the identifier.

Optionally, the apparatus 700 further includes a sending module 730, configured to flood the first IPv6 address of the first forwarding device and the identifier to a network by using a routing protocol.

Optionally, the processing module 720 is specifically configured to: when a next header NH field in the IPv6 basic header is an extension header carrying one BIER header, perform BIER forwarding based on a bit string field in the BIER header.

Optionally, the processing module 720 is specifically configured to: when a next header NH field in the IPv6 basic header is a routing header RH, and a next header NH field in the routing header RH is an extension header carrying one BIER header, pop the routing header RH, and perform BIER forwarding based on a bit string field in the BIER header.

Optionally, the routing header RH is a segment routing header SRH, and a segment left SL of the segment routing header SRH is 0.

Optionally, the processing module 720 is specifically configured to: when a next header NH field in the IPv6 basic header is an extension header carrying one BIER header, and a next header NH field in the extension header is an AH, perform BIER forwarding based on a bit string field in the BIER header.

Optionally, the processing module 720 is specifically configured to: fill a first IPv6 address of a third forwarding device in the destination address field in the IPv6 basic header of the BIER packet based on the bit string in the BIER header and a BIER forwarding table, where the BIER forwarding table is established based on a first IPv6 address carried in a BIER message flooded by the third forwarding device, and the first forwarding device replicates the BIER packet to the third forwarding device based on the BIER forwarding table.

Optionally, the processing module 720 is specifically configured to: pop one or more carried BIER headers; pop an extension header that includes one or more BIER headers; and replicate a BIER packet that does not include the extension header to the third forwarding device.

Optionally, the processing module 720 is specifically configured to: when determining that the third forwarding device is a leaf node, pop the extension header that includes one or more BIER headers.

Optionally, the extension header is a destination options header.

Optionally, the routing protocol includes any one of the following protocols: an intermediate system to intermediate system IS-IS protocol, an open shortest path first OSPF protocol, or a border gateway protocol BGP.

Figure 8:
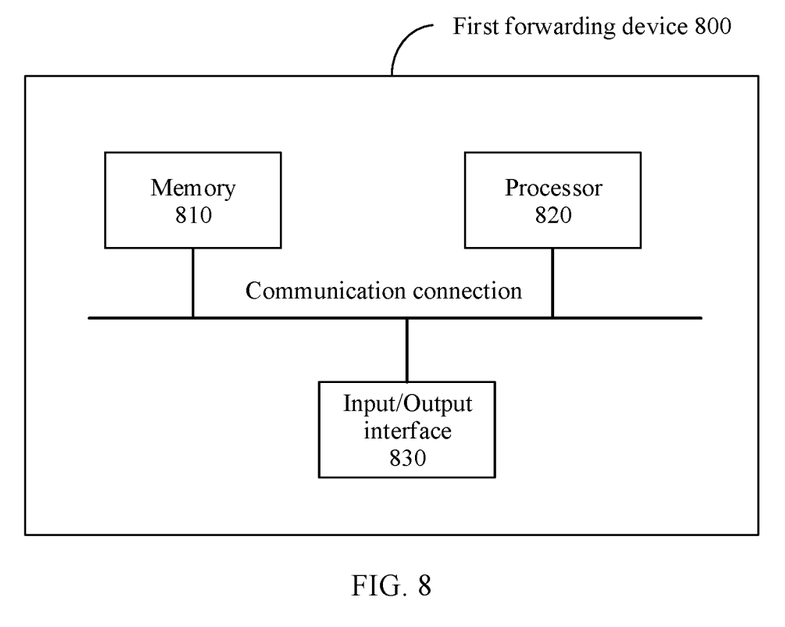
FIG. 8 is a schematic structural diagram of a first forwarding device 800 according to an embodiment of this application.

FIG. 8 is a schematic structural diagram of a first forwarding device 800 according to an embodiment of this application. The first forwarding device 600 may include a memory 810, a processor 820, and an input/output interface 830.

The memory 810, the processor 820, and the input/output interface 830 are connected by using an internal connection path. The memory 810 is configured to store program instructions. The processor 820 is configured to execute the program instructions stored in the memory 810, to control the input/output interface 830 to receive input data and information, and output data such as an operation result.

It should be understood that, the processor 820 in the embodiment of this application may be a central processing unit (CPU), or may further be another general purpose processor, a digital signal processor (DSP), an application specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like. Alternatively, the processor 820 may be one or more integrated circuits, and is configured to execute a related program, to implement the technical solutions provided in the embodiments of this application.

The memory 810 may include a read-only memory and a random access memory, and provide instructions and data to the processor 820. A part of the processor 820 may further include a non-volatile random access memory. For example, the processor 820 may further store information of a device type.

In an implementation process, steps in the foregoing methods can be implemented by using a hardware integrated logical circuit in the processor 820, or by using instructions in a form of software. The methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 810, and the processor 820 reads information in the memory 810 and completes the steps in the foregoing methods in combination with hardware of the processor. To avoid repetition, details are not described herein again.

It should be understood that the first forwarding device 800 according to the embodiment of this application is configured to perform corresponding procedures of the methods shown in FIG. 2 to FIG. 4 in the embodiments of this application. In addition, the foregoing and other operations and/or functions of the modules in the first forwarding device 800 are separately used to implement corresponding procedures of the methods shown in FIG. 2 to FIG. 4 in the embodiments of this application. For brevity, details are not described herein again.

It should be noted that, in the first forwarding device 800 shown in FIG. 8, the processor may invoke a computer program in the memory to implement the steps performed by the modules. For example, the processor may invoke computer instructions stored in a cache to perform the steps to be performed by the modules (for example, the receiving module 710 and the processing module 720 shown in FIG. 7).

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In some embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A packet sending method, wherein the method comprises:
   receiving, by a first forwarding device, an internet protocol version 6 (IPv6) packet from a second forwarding device, wherein the IPv6 packet comprises an IPv6 basic header and a bit index explicit replication (BIER) information, and a destination address field in the IPv6 basic header comprises a first IPv6 address of the first forwarding device; and
   performing, by the first forwarding device, BIER forwarding on the IPv6 packet according to an identifier stored in the first forwarding device, in response to the identifier corresponding to the first IPv6 address;
   wherein the performing, by the first forwarding device, BIER forwarding on the IPv6 packet according to the identifier stored in the first forwarding device comprises:
     determining, by the first forwarding device, that the first IPv6 address in the destination address field in the IPv6 basic header matches the identifier in the first forwarding device; and
     determining, by the first forwarding device, according to the identifier corresponding to the first IPv6 address, to perform BIER forwarding on the IPv6 packet.

2. The method according to claim 1, wherein the identifier is an IPv6 address, the first IPv6 address in the destination address field in the IPv6 basic header is the same as the identifier in the first forwarding device.

3. The method according to claim 1, wherein before the receiving, by the first forwarding device, the IPv6 packet from the second forwarding device, the method further comprises:
   flooding, by the first forwarding device, the first IPv6 address of the first forwarding device to a network by using a routing protocol.

4. The method according to claim 3, wherein the routing protocol comprises any one of the following protocols: an intermediate system to intermediate system (IS-IS) protocol, an open shortest path first (OSPF) protocol, or a border gateway protocol (BGP).

5. The method according to claim 1, wherein the performing, by the first forwarding device, BIER forwarding on the IPv6 packet according to the identifier that is in the first forwarding device comprises:
   performing, by the first forwarding device, BIER forwarding on the IPv6 packet according to the BIER information.

6. The method according to claim 5, wherein the BIER information comprises a bit string, and the performing, by the first forwarding device, BIER forwarding on the IPv6 packet according to the BIER information comprises:
   searching, by the first forwarding device, a bit index forwarding table (BIFT) based on the bit string; and;
   forwarding, by the first forwarding device, the IPv6 packet based on a query result of the BIFT.

7. The method according to claim 6, wherein the forwarding, by the first forwarding device, the IPv6 packet based on the query result of the BIFT comprises:
   updating, by the first network device, the destination address field in the IPv6 basic header of the IPv6 packet to an IPv6 address of a third forwarding device, wherein the BIFT is established according to the IPv6 address of the third forwarding device carried in a BIER message flooded by the third forwarding device; and;
   replicating, by the first forwarding device, the IPv6 packet with the updated destination address field to the third forwarding device according to the BIFT.

8. The method according to claim 1, wherein the IPv6 packet further comprises an extension header, and the extension header comprises the BIER information.

9. The method according to claim 8, wherein the extension header is a destination option header, a routing header (RH), or an authentication header (AH).

10. The method according to claim 1, wherein the first IPv6 address is a first segment identifier (SID).

11. The method according to claim 10, wherein a type of the first SID is End.BIER.

12. The method according to claim 1, wherein the method further comprises:
    popping, by the first forwarding device, the extension header comprising the BIER information; and
    forwarding, by the first forwarding device, the IPv6 packet that does not comprise the extension header to a third forwarding device, wherein the third forwarding device is a BIER forwarding egress router (BFER).

13. The method according to claim 1, wherein the method further comprises:
    popping, by the first forwarding device, the carried BIER information; and;
    forwarding, by the first forwarding device, a packet that does not comprise the BIER information to a third forwarding device, wherein the third forwarding device is a BFER.

14. The method according to claim 1, wherein the first IPv6 address is a unicast address.

15. A packet sending apparatus, applied to a first forwarding device and comprising:
    a non-transitory memory storing instructions; and
    a processor coupled to the non-transitory memory; wherein the instructions, when executed by the processor, cause the apparatus to be configured to:
    receive an internet protocol version 6 (IPv6) packet from a second forwarding device, wherein the IPv6 packet comprises an IPv6 basic header and a bit index explicit replication (BIER) information, and a destination address field in the IPv6 basic header comprises a first IPv6 address of the first forwarding device;
    determine that the first IPv6 address in the destination address field in the IPv6 basic header matches an identifier stored in the first forwarding device; and
    determine, according to the identifier corresponding to the first IPv6 address, to perform BIER forwarding on the IPv6 packet.

16. The apparatus according to claim 15, wherein
the identifier is an IPv6 address, the first IPv6 address in the destination address field in the IPv6 basic header is the same as the identifier in the first forwarding device.

17. The apparatus according to claim 15, wherein the instructions, when executed by the processor, further cause the apparatus to be configured to:
flood the first IPv6 address of the first forwarding device to a network by using a routing protocol.

18. The apparatus according to claim 15, wherein the instructions, when executed by the processor, further cause the apparatus to be configured to:
perform BIER forwarding on the IPv6 packet according to the BIER information.

19. The apparatus according to claim 18, wherein the BIER information comprises a bit string and wherein the instructions, when executed by the processor, further cause the apparatus to be configured to:
search a bit index forwarding table (BIFT) based on the bit string; and;
forward the IPv6 packet based on a query result of the BIFT.

20. The apparatus according to claim 19, wherein the instructions, when executed by the processor, further cause the apparatus to be configured to:
update the destination address field in the IPv6 basic header of the IPv6 packet to an IPv6 address of a third forwarding device, wherein the BIFT is established according to the IPv6 address of the third forwarding device carried in a BIER message flooded by the third forwarding device; and;
copy the IPv6 packet with the updated destination address field to the third forwarding device according to the BIFT.

21. The apparatus according to claim 15, wherein the IPv6 packet further comprises an extension header, and the extension header comprises the BIER information.

22. The apparatus according to claim 21, wherein the extension header is a destination option header, a routing header (RH), or an authentication header (AH).

23. The apparatus according to claim 15, wherein the first IPv6 address is a first segment identifier (SID).

24. The apparatus according to claim 23, wherein a type of the first SID is End.BIER.

25. The apparatus according to claim 15, wherein the instructions, when executed by the processor, further cause the apparatus to be configured to:
pop the extension header comprising the BIER information; and
forward the IPv6 packet that does not comprise the extension header to a third forwarding device, wherein the third forwarding device is a BIER forwarding egress router (BFER).

26. The apparatus according to claim 15, wherein the instructions, when executed by the processor, further cause the apparatus to be configured to:
pop the carried BIER information; and;
forward a packet that does not comprise the BIER information to a third forwarding device, wherein the third forwarding device is a BFER.

27. The apparatus according to claim 15, wherein the first IPv6 address is a unicast address.

28. A non-transitory computer-readable storage medium, comprising a computer program, wherein when the computer program is run on a computer, the computer is caused to:
receive an internet protocol version 6 (IPv6) packet from a second forwarding device, wherein the IPv6 packet comprises an IPv6 basic header and a bit index explicit replication (BIER) information, and a destination address field in the IPv6 basic header comprises a first IPv6 address of a first forwarding device;
determine that the first IPv6 address in the destination address field in the IPv6 basic header matches an identifier stored in the first forwarding device; and
determine, according to the identifier corresponding to the first IPv6 address, to perform BIER forwarding on the IPv6 packet.

29. The non-transitory computer-readable storage medium according to claim 28, wherein the first IPv6 address is a unicast address.

* * * * *